United States Patent [19]

Parewski

[11] Patent Number: 5,170,713
[45] Date of Patent: Dec. 15, 1992

[54] WHEEL ASSEMBLY FOR A STORAGE AND RETRIEVAL MACHINE
[75] Inventor: Steven R. Parewski, Milwaukee, Wis.
[73] Assignee: Harnischfeger Engineers, Brookfield, Wis.
[21] Appl. No.: 594,795
[22] Filed: Oct. 9, 1990
[51] Int. Cl.⁵ ............................................. B60B 35/10
[52] U.S. Cl. ................................... 104/88; 301/111; 295/43
[58] Field of Search .................... 104/88; 295/43, 1; 301/1, 111, 128, 9 TV; 105/170, 218.1, 220; 16/19, 31 R, 18 R

[56] References Cited
U.S. PATENT DOCUMENTS 4,773,691 9/1988 Bernd et al. ................ 105/218.1 X
4,846,073 7/1989 Boyer et al. ........................ 104/88
5,005,912 4/1991 Pipes .................................. 301/1 X Primary Examiner—Margaret A. Focarino
Assistant Examiner—Joseph D. Pape
Attorney, Agent, or Firm—Richard C. Ruppin

[57] ABSTRACT

A wheel assembly for a storage and retrieval machine which is travelable on a rail along a path adjacent overhead storage locations which store objects delivered to and retrieved from the locations by the storage and retrieval machine. The storage and retrieval machine includes a base which is supported on the rail by the wheel assembly. The wheel assembly comprises a wheel engaging the rail and having a horizontal axis of rotation and an upwardly extending axis projecting through the wheel. A wheel support is affixed to the base and includes a bracket on which the wheel is mounted. The bracket has a plate member extending laterally of and around the upwardly extending axis of the wheel. A positioning mechanism is provided for angularly positioning the wheel about the upwardly extending axis and has a plurality of set screws spaced from and in a surrounding relationship to the upwardly extending axis and engaging the plate member of the bracket upon which the wheel is mounted. The wheel support also includes a frame affixed to and vertically movable on the base for positioning the height of the wheel and thereby the height of the base.

9 Claims, 2 Drawing Sheets

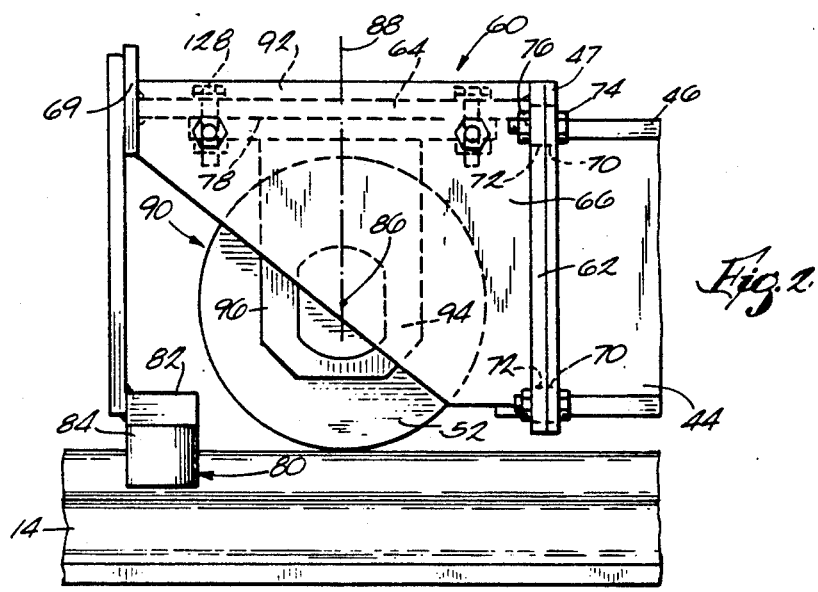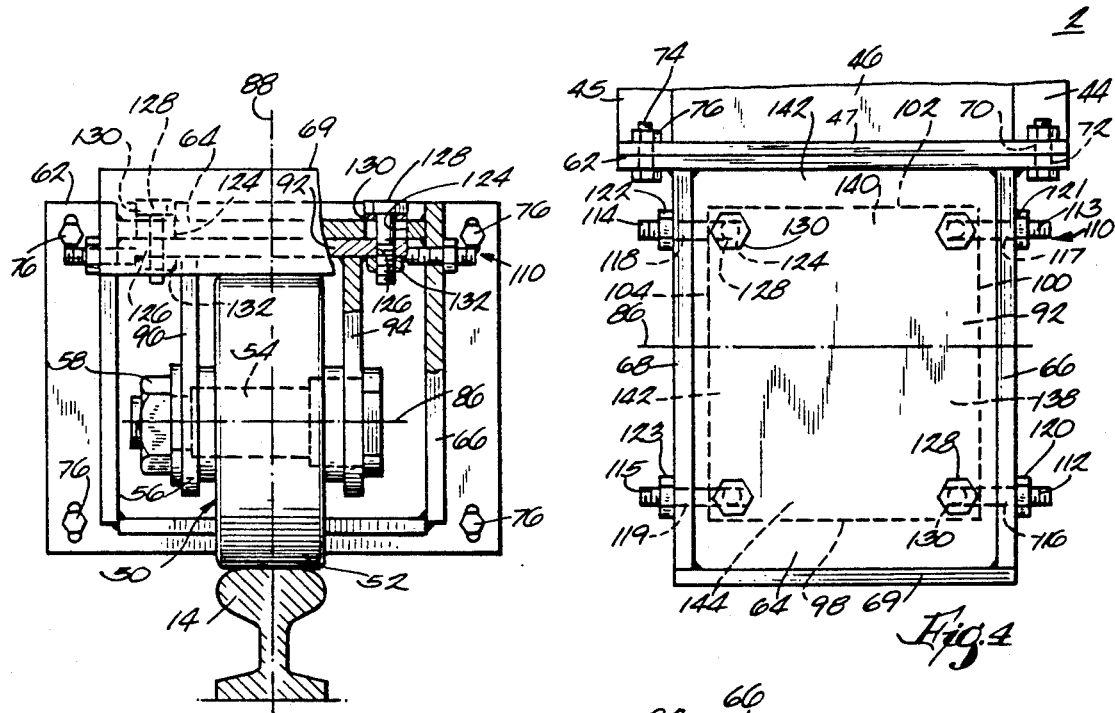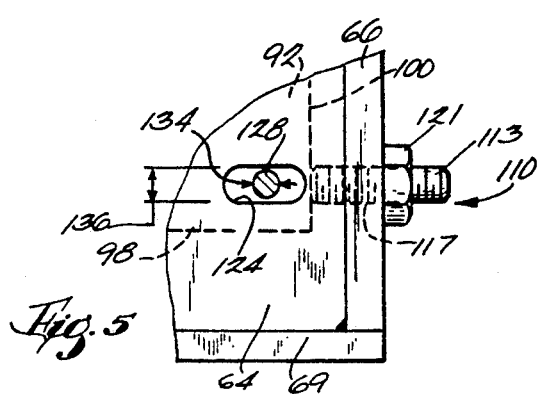

WHEEL ASSEMBLY FOR A STORAGE AND RETRIEVAL MACHINE

FIELD OF THE INVENTION

This invention relates to a wheel assembly for supporting the base of a storage and retrieval machine on a rail along which the storage and retrieval machine is travelable and, in particular, to a wheel assembly which is positionable to correct skew and adjust the height of a storage and retrieval machine on the rail.

BACKGROUND OF THE INVENTION

Storage and retrieval machines are commonly used in material and inventory storage facilities for storing items in and retrieving the items from the facilities. Typical of such facilities are warehouses having storage racks of substantial height and width arranged along aisles in which the storage and retrieval machines travel on rails to various rack locations. Due to the need to have a highly efficient storage facility, the storage racks are designed to provide a maximum number of rack storage locations in both height and width directions.

The storage and retrieval machines are typically self-propelled by electric drive motors and operate continuously and automatically at the direction of a control system including control components located both on the storage and retrieval machine and remote from the machine. Storage and retrieval machines typically have a continuous very high duty usage which subjects them to a high level of wear which frequently is not monitored and promptly corrected, particularly due to the continuous and automatic operation of the machine from remote control locations. One of the major areas of wear is that of the base wheels and wheel bearings. The wear of the wheels and their bearings is particularly exacerbated when the wheels roll at a skew angle relative to the rails. Running the storage and retrieval machine in the direction of the rail while the wheels are rolling at a skew angle relative to the rail causes wear of the wheels and rail surface as well as placing a high thrust load on the wheel bearings causing their deterioration.

The ability to easily position rails on storage and retrieval machines in alignment and without skew relative to the supporting rail and to reliably hold the wheels in the correct position is critical to avoid rapid, substantial wear on the wheels. Presently known positioning devices do not provide easy position adjustment and reliable holding of the wheel position, and frequently the wheel bearing, support frame and positioning mechanism of present wheel holding devices occupies a substantial amount of space requiring enlargement of the entire base to which the wheels are affixed. An example of one present approach to wheel support which is used to align the wheels with a rail is the provision of separate adjustment mechanisms for each of the two pillow blocks supporting each end of a wheel axle. Because of the need to provide access to hold the bearings and their races in place, the wheel positioning mechanism cannot be located where it is most effective in holding the pillow blocks properly positioned. Also, providing space for access to the bearings as well as space for the position adjustment mechanism results in an undesirable lengthening of the base on which the wheel is mounted.

SUMMARY OF THE INVENTION

It is a general object of this invention to provide a wheel assembly for the base of a storage and retrieval machine which is easily adjustable to position the wheel relative to the rail and reliably holds the wheel in the desired position. It is a further object of the invention to provide a wheel assembly which is positionable to position the wheel at an angular position relative to an upwardly extending axis and to position the wheel in directions laterally of the rail.

The invention is carried out by providing a base for a storage and retrieval machine which is travelable on a rail along a path adjacent overhead storage locations which store objects delivered to and retrieved from the locations by the storage and retrieval machine. The base is supported on the rail by a plurality of wheel assemblies, at least one of which comprises a wheel means including a wheel engaging the rail and having a horizontal axis of rotation and an upwardly extending axis projecting through the wheel. Wheel support means is affixed to the base and includes a bracket on which the wheel is mounted. The bracket includes a plate member extending laterally of and around the upwardly extending axis of the wheel. Positioning means is provided for angularly positioning the wheel about the upwardly extending axis. The positioning means includes a plurality of holding means spaced from and in a surrounding relationship to the upwardly extending axis and engaging the plate member of the bracket upon which the wheel is mounted.

The wheel support means may also include a frame means affixed to and vertically movable on the base for positioning the height of the wheel and thereby the height of the base. The bracket means is then mounted on the frame means and is movable horizontally on the frame means for positioning the wheel. Consequently, the wheel can be positioned both in the vertical direction by adjustment of the position of the frame means and in directions either laterally of the rail or angularly relative to the length of the rail by adjusting the position of the wheel on the bracket means.

BRIEF DESCRIPTION OF THE DRAWINGS

Further objects and advantages will appear when taken in conjunction with the accompanying drawings, in which:

FIG. 2 is an enlarged side elevation view of the wheel assembly illustrated in FIG. 1;

FIG. 3 is a front elevation view of the wheel assembly shown in FIG. 2;

FIG. 4 is a plan view of wheel assembly shown in FIGS. 2 and 3; and

FIG. 5 is an enlarged plan view of a part of the wheel assembly shown in FIG. 4 with portions removed for illustrative purposes.

DETAILED DESCRIPTION OF THE INVENTION

Figure 1:
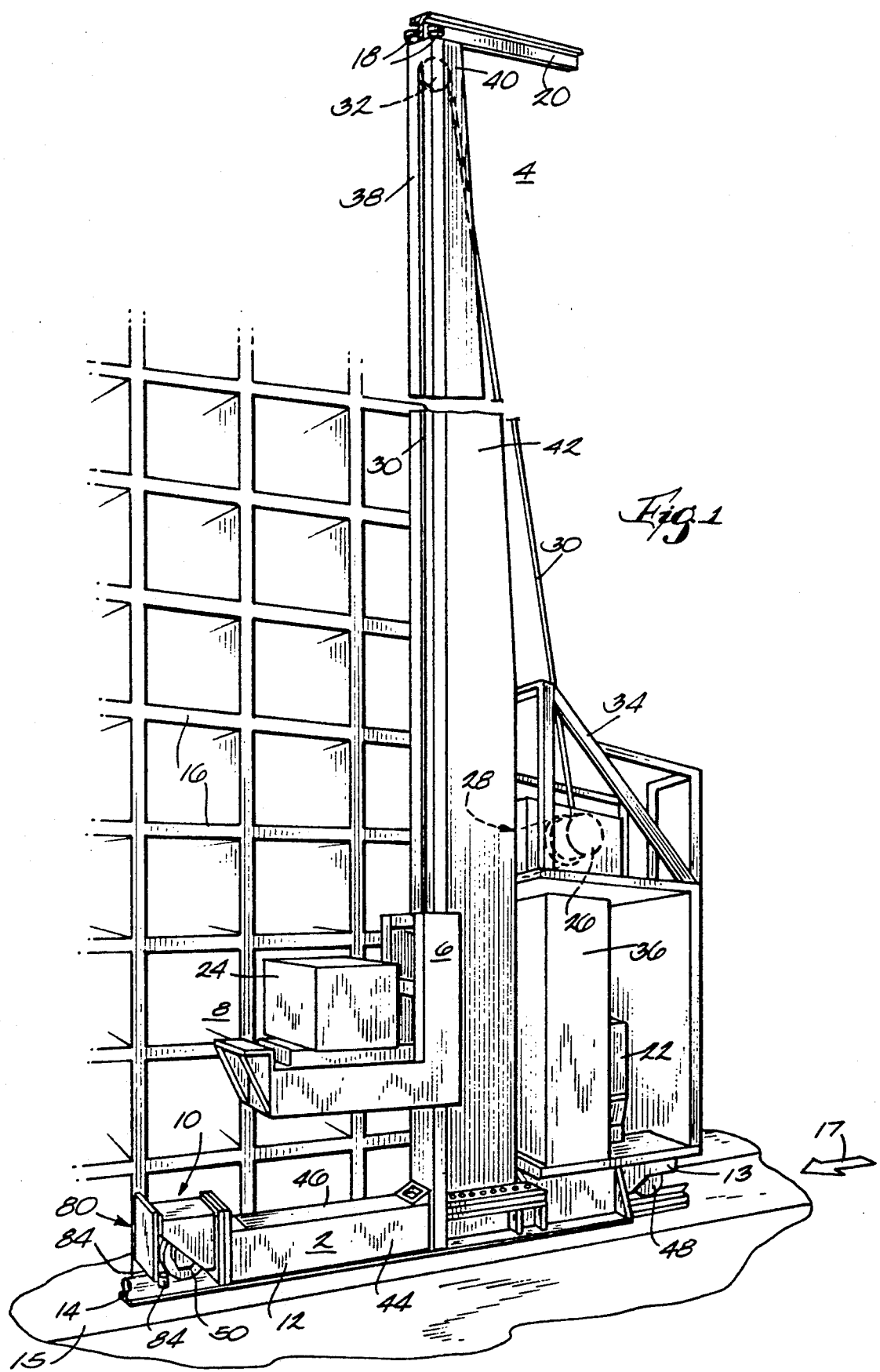
FIG. 1 is a perspective view of a storage and retrieval machine utilizing the wheel assembly according to the invention.

Referring generally to FIG. 1 of the drawings, a storage and retrieval machine is shown having a base 2, a mast 4 mounted on and extending upwardly from the base 2, a carriage 6 movable along the length of the mast 4 to selected vertical positions, and a shuttle 8 mounted on the carriage 6. The mast 4 is comprised of an elongated tube member 38 and an elongated member 42. A rear wheel 48 is mounted on a rear end section 13 of the base 2 and a front wheel 50 is mounted on a front wheel assembly 10 which is affixed to the front end 12 of the base 2. The wheels 48 and 50 roll along the length of a rail 14 supported on a foundation 15 running through an aisle path indicated by the arrow 17 in a storage area such as a warehouse having stacked storage racks 16. Upper guide wheels 18 on the upper end 40 of the mast 4 engage an upper guide rail 20 to guide the storage and retrieval machine along the rail 14 and maintain the machine in an upright position. A motor 22 mounted on the base 2 drives the rear wheel 48 so that the storage and retrieval machine travels along the rail 14 to selected positions in the aisle path 17 adjacent to the stacked storage racks 16. At each aisle position of the storage and retrieval machine the carriage 6 is driven in vertical directions to a position opposite a selected one of the storage racks 16 where the shuttle 8 is driven substantially in horizontal directions into a storage rack to deliver or retrieve an object such as a box 24 shown in FIG. 1. The carriage 6 is driven by a motor 26 acting through a rope drum assembly 28, both mounted on a frame 34 affixed to the base 2 and the mast 4, and driving a rope 30 connected to the carriage 6 and reeved over a sheave 32. The sheave 32 is rotatably supported on the tube member 38 so that the weight of the carriage 6 and any object 24 carried by it is directly supported by tube member 38. A control 36 is also mounted on the base 2 for controlling the operation and movement to selected locations of the base 2, the carriage 6 and shuttle 8. Suitable means (not shown) are provided for supplying electrical power to the motors mounted on the base and carriage and control signals to the control 36.

The base 2 comprises two parallel spaced apart L-shaped members 44 and 45. The plate 46 and L-shaped members extend along a substantial portion of the length of the base 2 and the rear end section 13 is affixed to the L-shaped members. A front flange plate 47 is affixed to the plate 46 and the L-shaped members 44,45 for supporting the wheel assembly 10.

The front wheel assembly 10 comprises a frame 60 mounted on the front end 12 of the base 2, a guide roller mechanism 80 mounted on the frame 60, a wheel support bracket 90 mounted on the frame 60, a wheel 50 rotatably mounted on the bracket 90, and a plurality of positioning mechanisms 110 mounted on the frame 60 and positioned in a surrounding relationship to the wheel support bracket 90 for positioning and holding the bracket and thereby the wheel 50. The frame 60 includes a base attachment plate 62 positioned against the front flange 47 of the base 2, a bracket attachment plate 64 positioned above the wheel 50, and side walls 66 and 68 which provide rigidity to the frame 60 and protection for the wheel 50. The various members of the frame 60 are attached together by suitable means such as welding to form an integral unit.

The flange 47 of the base 2 includes vertical through slots 70 extending through it and the attachment plate 62 of the frame includes vertical through slots 72 which may be positioned in alignment with the slots 70. A threaded bolt 74 extends through each of the aligned slots 70 and 72 and a nut 76 is threaded on to each of the bolts 74 to mount the frame 60 on the base 2. In attaching the frame 60 to the base 2, the base 2 may be moved vertically due to the vertical disposition of the slots 70 and 72 and the nuts and bolts then tightened to thereby set the height of the base and the storage and retrieval machine. The guide roller mechanism 80 includes an attachment plate 69, a support plate 82 attached to the plate 69 and on which is mounted a pair of guide roller brackets each carrying a guide roller 84 positioned on opposite sides of the rail 14.

The wheel support bracket 90 includes an attachment plate 92 positioned above the wheel 50 and in engagement with the underside 78 of the frame plate 64. A pair of spaced apart arms 94 and 96 are affixed to and extend downwardly from the plate 92. The plate 92 of the bracket includes peripheral edge surfaces 98, 100, 102 and 104 which respectively face and are spaced from guide roller attachment plate 69, side wall 66, base attachment plate 62 and side wall 68 of the frame 60. The wheel 50 includes an annular rotating member 52 positioned between the arms 94 and 96, a wheel shaft 54 extending through the arms 94 and 96 to rotatably mount the annular member 52 on the wheel bracket 90, a securement washer 56 and a nut 58 threaded on the shaft 54. The wheel 50 rotates about an axis 86 which is coaxial with the wheel shaft 54 and is angularly positionable about an upwardly extending axis 88 which preferably intersects the rotational axis 86.

The positioning mechanism 110 preferably comprises a plurality of set screws 112, 113, 114 and 115 respectively threaded through threaded openings 116, 117, 118 and 119 in one of the walls 66, 68 of the frame 60. The screws 112, 113, 114 and 115 are respectively "locked" at their threaded position on the frame 60 by nuts 120, 121, 122 and 123. The bracket attachment plate 64 includes slotted, through openings 124 extending in directions laterally of the length of the rail 14. The attachment plate 92 of the frame includes through openings 126 positioned in alignment with the slotted openings 124. Bracket attachment bolts 128 extend through washers 130 and through the aligned openings 124 and 126 and have nuts 132 threaded on their lower ends. Tightening of the nuts 132 on the bolts 128 secures the bracket 90 and thereby the wheel 50 to the frame 60 and base 2. As shown in FIG. 5, the bolts 128 have a shank diameter 134 that is less than the width 136 of the slotted openings 124 in the direction of the length of the rail 14 so that the wheel 50 may be positioned and secured to the frame 60 in angular rotation directions about the axis 88. With reference to FIGS. 3 and 4, the bracket attachment plate 92 extends laterally of and around the axis 88. The attachment plate 92 also is comprised of sections 138, 140, 142 and 144 which are positioned between adjacent pairs of the positioning screws 112-115. For example, sections 140 and 142 are positioned between adjacent screws 113 and 114, and sections 138 and 144 are positioned between adjacent screws 112 and 115.

To position the bracket 90 and thereby the wheel 50 in a selected position, the nuts 132 are loosened on the bolts 128, the nuts 120-123 are loosened on the screws 112-115, and the screws 112-115 are turned in their threaded openings on the frame 60 to bear tightly against one of the edge surfaces 98, 100, 102 and 104 of the wheel bracket 90. With this arrangement, the forces of screws 112-115 hold the wheel bracket very firmly in place. The screws may be turned to move the wheel bracket 90 in directions laterally of the length of the rail 14 or to rotate the bracket 90 and the wheel 50 about the upwardly extending axis 88 to angularly rotate the wheel 50. Angular rotation of the wheel 50 about the axis 88 sets the skew angle of the wheel 50. The skew angle is the angle between the direction in which the wheel travels and the direction of the length of the rail 14. Ideally, the rolling or traveling direction of the wheel 50 is perfectly aligned with the direction of the length of the rail 14, that is, the skew angle is zero. Angular rotation of the bracket 90 is permitted by the clearance distance between the shank diameter 134 and the slot width 136 of the slotted openings which is sufficient to allow the rotation desired. When the bracket 90 has been positioned by the screws 112-115 to the selected lateral position of the wheel in which it is preferably centered over the rail 14 and the skew angle has been set, the nuts 120-123 are tightened against the frame 60 on the screws 112-115 to hold the bracket 90 in the set position. The nuts 132 are then tightened on the bolts 128 to provide further holding force on the bracket. Because the screws 112-115 and nuts 120-123, and nuts and bolts 132, 128, are readily accessible externally of the base 2, as can be seen in FIGS. 1-4, the skew and lateral positions of the wheel 50 are easily adjustable.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. In a storage and retrieval machine travelling on a rail for carrying objects to and from overhead storage locations and having a base, an improved wheel assembly comprising:
    a wheel assembly having a substantially flat bracket attachment plate stationary with respect to the base;
    wheel means including a wheel engaging the rail and having a horizontal axis of rotation;
    wheel support means including a bracket having a substantially flat bracket plate mounted for lateral sliding movement relative to the attachment plate, the wheel being mounted on the bracket; and
    positioning means including a plurality of holding means engaging the bracket plate for sliding positioning of the bracket plate, thereby positioning the wheel along the horizontal axis of rotation.

2. The assembly according to claim 1 wherein the plate member comprises a plurality of sections, each of the sections being positioned between at least adjacent pair of the holding means.

3. The assembly according to claim 1 wherein the wheel has an upwardly extending axis and the bracket plate is also mounted for angular movement about the upwardly extending axis.

4. The assembly according to claim 3 wherein the upwardly extending axis intersects the rotation axis.

5. In a storage and retrieval machine travelling on a rail for carrying objects to and from overhead storage locations and having a base, an improved wheel assembly comprising:
    wheel means including a wheel engaging the rail and having a horizontal axis of rotation for supporting the base for travel;
    bracket means on which the wheel is mounted, the bracket means being laterally movable for positioning the wheel assembly at selected horizontal positions;
    wheel support means on which the bracket means is mounted including frame means affixed to and vertically movable on the base for positioning the height of the base; and
    holding means disposed around the bracket means and engaging the bracket means for holding the bracket means and thereby the wheel at said selected horizontal positions.

6. The assembly according to claim 5 wherein the bracket means is movable to a first portion of said selected horizontal positions in angular directions relative to the length of the rail.

7. The assembly according to claim 6 wherein the bracket means is movable to a second portion of said selected positions in directions laterally of the length of the rail.

8. The assembly according to claim 5 wherein the bracket means is movable to a first portion of said selected positions in directions laterally of the length of the rail.

9. The assembly according to claim 7 wherein:
    the bracket means includes a horizontally extending plate member having an outer periphery; and
    the holding means comprises a plurality of set screws spaced apart from each other and each engaging the outer periphery of the plate member for urging the plate member in either or both of two horizontal directions.

* * * * *